United States Patent
Bienn et al.

(10) Patent No.: US 8,213,365 B2
(45) Date of Patent: *Jul. 3, 2012

(54) CALL ORIGINATION IN A CDMA LEGACY MS DOMAIN USING SIP

(75) Inventors: Marvin Bienn, Dallas, TX (US); Gary Stephens, Richardson, TX (US); Jayshree A. Bharatia, Plano, TX (US)

(73) Assignee: Ericsson AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/830,407

(22) Filed: Jul. 5, 2010

(65) Prior Publication Data
US 2010/0272072 A1 Oct. 28, 2010

Related U.S. Application Data

(63) Continuation of application No. 10/997,261, filed on Nov. 24, 2004, now Pat. No. 7,751,359.

(60) Provisional application No. 60/525,172, filed on Nov. 26, 2003.

(51) Int. Cl.
*H04W 4/00* (2009.01)
*H04L 12/66* (2006.01)

(52) U.S. Cl. ......... 370/328; 370/352; 455/445; 455/560

(58) Field of Classification Search .................. 370/328, 370/329, 352, 395.2; 455/445, 560, 414.4, 455/422.1, 418; 379/219, 22; 709/227–229
See application file for complete search history.

(56) References Cited

U.S. PATENT DOCUMENTS

| | | | |
|---|---|---|---|
| 6,256,612 B1 * | 7/2001 | Vo et al. | 704/500 |
| 7,031,703 B1 * | 4/2006 | Graf et al. | 455/432.1 |
| 2003/0147427 A1 * | 8/2003 | Sekino et al. | 370/503 |
| 2004/0032843 A1 * | 2/2004 | Schaefer et al. | 370/338 |

* cited by examiner

*Primary Examiner* — George Eng
*Assistant Examiner* — Marcos Torres
(74) *Attorney, Agent, or Firm* — Garlick & Markison; Kevin L. Smith

(57) ABSTRACT

A system and a method in a wireless network utilizing session initiation protocol (SIP) for call control. The SIP payload (SDP) contains a list of voice codecs to coordinate the selection of voice bearer resources (between a calling party and a called party) such that the number of transcoders in the voice bearer path is minimized. An additional aspect of the embodiment of the present invention includes a serving MSCe that is operable to determine whether to initiate or discontinue ringback to the calling party. If ring back is to be initiated, ringback can be initiated from a Serving MGW controlled by the serving MSCe. The call negotiation process according to the described embodiment of the invention eliminates the requirement for any transcoding in specific situations to result in the number of transcoders used in the voice bearer path to be reduced to 0 (TrFO, Transcoder Free Operation) or to 1 (RTO, remote transmitter operation).

14 Claims, 3 Drawing Sheets

CALL ORIGINATION IN A CDMA LEGACY MS DOMAIN USING SIP

CROSS-REFERENCE TO RELATED APPLICATIONS

The present U.S. Utility Patent Application claims priority pursuant to 35 U.S.C. §120, as a continuation, to U.S. Utility application Ser. No. 10/997,261, entitled "Call Origination in a CDMA Legacy MS Domain Using SIP,", filed Nov. 24, 2004, now issued as U.S. Pat. No. 7,751,359, on Jul. 6, 2010, which claims priority pursuant to 35 U.S.C. §119(e) to U.S. Provisional Application Ser. No. 60/525,172, entitled "Call Origination in a CDMA Legacy MS Domain Using SIP," filed Nov. 26, 2003, expired, all of which are hereby incorporated herein by reference in its entirety and made part of the present U.S. Utility Patent Application for all purposes.

BACKGROUND

1. Technical Field

The present invention relates generally to communication networks, and more particularly, to a CMDA2000 network that uses Session Initiation Protocol (SIP) for call control over a wireless communication network.

2. Related Art

Traditional telephone networks, including the Public Switched Telephone Network (PSTN) and Signaling System Number 7 (SS7) networks, have provided closed systems that enabled users to achieve added capabilities beyond merely connecting a call. Initially, message storage capabilities such as those provided by answering machines and voice mail services (in SS7 networks) were popular. Since then, many other services have been developed as SS7 and other intelligent networks (IN and AIN) have gained widespread popularity. With the advent of Internet telephony (the use of an Internet, public or private, to transport voice services), a need to provide voice services, beyond those thought of as traditional services, has been realized.

During the past few years, Internet telephony has evolved from being a novelty for the technically-oriented seeking party conversation material to a technology that, in the not too distant future, may largely replace the existing PSTN. Supporting the widespread use of Internet telephony requires a host of standardized protocols to ensure that audio and video data are routed correctly and are transported with a specified quality of service (QoS). Call control protocols are of particular interest because they are the basis that allow for advanced services such as number portability, multiparty conferencing, voice/video mail, and automatic call distribution.

Session Initiation Protocol (SIP) is an application-layer control (signaling) protocol (defined in RFC3261) designed for creating, modifying, and terminating sessions (e.g., Internet telephony) with one or more participants. Its strengths include simplicity, scalability, extensibility, and modularity. As a result, increasing interest in SIP is being realized as the SIP standards and protocol requirements develop into maturity.

As a traditional text-based Internet protocol, SIP resembles the hypertext transfer protocol (HTTP) and simple mail transfer protocol (SMTP). SIP uses Session Description Protocol (SDP) for describing multimedia sessions for the purposes of session announcement, session invitation, and other forms of multimedia session initiation. SIP, however, is independent of the transport layer (i.e., IP) and also supports mechanisms for encryption and authentication.

Current CDMA related standards for circuit-switched networks only address using network protocols such as SS7 for setting up a voice service. CDMA circuit-switched networks that use network protocols, such as SS7, for call control have several drawbacks for mobile-to-mobile calls. One that is significant is that the voice bearer path (path actually carrying the voice between the two mobiles) for mobile-to-mobile calls will require two transcodings by two transcoders. A transcoder is a device that changes data (e.g., audio) from one format to another (e.g., from EVRC to G.711). For audio data streams transcoding is undesirable for it decreases voice quality and increases the time delay between the end users. A need exists, therefore, for a system and method that minimizes the number of transcoders between a calling party and a called party.

A shortcoming of LMSD systems is ringback (or call progress tones) to the calling party. Ringback is traditionally generated by the network supporting the called party. As compared to circuit-switched networks, the timing of when ringback is sent by the network supporting the called party back to the calling party is somewhat longer in time and can result in discomfort to the calling party (i.e., the feeling on the part of the user that nothing is happening). This increase in time is a result of the method of establishing the voice-bearer path. The voice bearer path, using SIP/SIP-T as the call control protocol, cannot be established until an exchange of bearer related information between the called party control entity and the calling party control entity occurs. A need exists, therefore to provide ringback to the calling party in an improved manner.

SUMMARY OF THE INVENTION

The embodiments of the present invention provide network entity interactions necessary for a CDMA wireless terminal device (e.g., mobile station (MS)) operating in a Legacy MS Domain (LMSD) to originate a call. Instead of SS7 as the call set-up protocol, the LMSD call control entity (MSCe) uses SIP/SIP-T as the signaling call control protocol. A SIP/SIP-T call setup message includes a Session Description Parameters (as defined is RFC2327) message containing information about the calling party terminal device capabilities. The parameters within the SDP message are used to possibly set up a call that results in the use of no transcoder in the voice bearer path between a calling party and a called party.

The call origination process, according to the described embodiment of the invention, allows for the possibility that the call negotiation process could result in no transcoding in the voice bearer path between a calling party and the called party (TrFO). In other situations, the described embodiment allows for the possibility that transcoding is not eliminated but is reduced wherein the number of transcoders used in the voice bearer path are reduced to 1 or what is known as Remote Transcoder Operation (RTO) instead of 2 transcoders as is presently required for prior art networks (e.g., networks that use SS7 for a call control protocol for call negotiation).

Additionally, the embodiments of the invention generally includes the transmission of messages and interactions between network entities within the Legacy MS Domain providing call control for the calling party, to be connected to a called party in a manner that reduces the number of transcodings and facilitates ringback (e.g., progress tones) operation.

The embodiments of the invention provide for a call origination message (also referred to as a call initiation request) to originate from an LMSD call control entity supporting the calling party (referenced as an originating or serving MSCe), using SIP/SIP-T. The SIP/SIP-T message used for call origination (e.g., SIP INVITE), carries more bearer related information than that carried in SS7 call setup messages, and more specifically, carries a list of voice codecs supported by the calling party terminal device (e.g., mobile station). The additional information, in the SIP/SIP-T message used for call origination, can possibly result in a call setup that results in less than two transcoders in the voice bearer path as is the norm with calls using SS7 for call setup. For example, a method and system of the embodiments of the invention allows for the called party call control entity to receive a list of codecs supported by the calling party terminal device.

Using the knowledge of what codecs are supported by the calling party, the called party call control entity is operable to instruct the terminal device supporting the called party to use one of the codecs in the list (assuming the called party terminal device supported one of the calling party codecs), thus avoiding a transcoding to an intermediate format that is then transcoded again at the receiving ends. Any reduction in the number of transcoders, in the voice bearer path, between the calling party and the called party will result in improved voice quality, reduced time delays, and reduced bandwidth requirements for the bearer transport system.

An additional aspect of the embodiment of the present invention includes a mechanism to trigger the originating/serving MSCe to start or stop ringback (referenced as origination-side ringback) to the calling party. Ringback to the calling party is traditionally a function of the network supporting the called party. For a calling party supported by an LMSD network, ringback generated from the network supporting the called party cannot be accomplished without additional and excessive network elements until a voice bearer path is established between the calling party and the called party. Establishment of the voice bearer path requires the exchange of information from the network supporting the called party back to the network supporting the calling party (a procedure not required by circuit-switched networks). Gathering this information requires time on the part of the network supporting the called party. Having a mechanism that triggers the originating/serving MSCe to start ringback to the calling party (before the voice bearer path is established) and to stop ringback to the calling party (after the voice bearer path is established to allow for the ringback generated by the network supporting the called party to reach the calling party) reduces discomfort (the feeling on the part of the user that nothing is happening) to the calling party.

Other aspects of the present invention will become apparent with further reference to the drawings and specification that follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
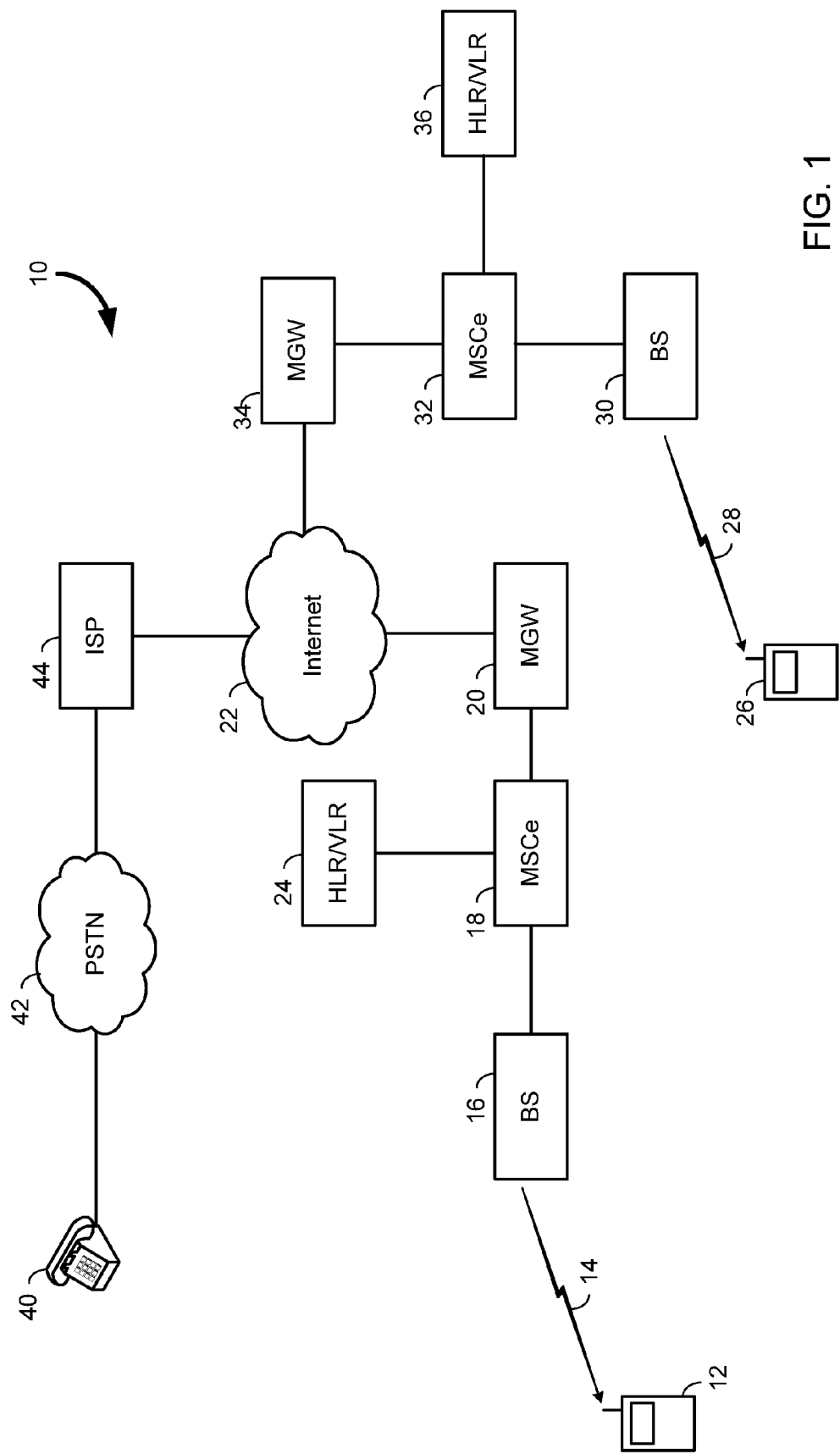
FIG. 1 is a functional block diagram of a communication network formed according to one embodiment of the invention.

FIG. 1 is a functional block diagram of a communication network formed according to one embodiment of the invention. Referring now to FIG. 1, a wireless network shown generally at 10 comprises, in the described embodiment, a code division multiple access (CDMA) network with a SIP/IP network overlay utilized for establishing a call between two parties according to one embodiment of the invention. While the described embodiment is for a CDMA network, the invention is not to be limited to such networks. It should be readily understood that the present teachings apply to other networks and other wireless access technologies as well.

CDMA related standards for circuit-switched networks only address using network protocols such as SS7 for call set-up signaling. In the network of FIG. 1, however, session initiation protocol (SIP) is utilized to assist with call set-up functionality. As such, additional information is carried in the call setup signaling (i.e., SIP-T/SIP) not provided for in traditional SS7 signaling. This additional information can possibly allow for a reduction in a number of transcoders that occur between originating and terminating mobile stations. Traditionally, mobile-to-mobile calls that use circuit-switched networks require two transcodings (by two transcoders) in the voice bearer path. The network of FIG. 1, however, provides for a system and method that allow for the possibility of minimizing the number of voice transcodings and thus minimizing voice call degradation and voice call delay.

One of the problems generated in a network is related to time delay required for the network supporting the called party to generate ringback to the calling party. A need exists, therefore, for mechanism to trigger the serving or origination MSCe to start and stop ringback for the calling party.

Heretofore, the serving or originating MSCe (call control entity for the calling party) will determine when to start and stop a locally generated ringback (referenced as origination-side ringback) to the calling party based upon received signaling from the network supporting the called party.

Along these lines, the network shown at 10 in FIG. 1 includes a mobile station (MS) 12 that is operatively coupled to communicate with and through network 10 by a communication link 14 that is established between MS 12 and a base station (BS) 16. BS 16 comprises a base station controller and a base station transceiver (radio and antenna) that form communication link 14 with MS 12. BS 16 is further coupled to a mobile switching center (MSCe) 18 for providing call control signaling and is coupled to media gateway (MGW) 20 for bearer transport. An MSCe 18 is coupled to media gateway (MGW) 20 and to a packet network 22. It should be further noted that packet network 22 can include any packet network including but not limited to an Internet. A MGW 20 is coupled to packet network 22. MSCe 18 is further coupled to a home location register/visitor location register (HLR/VLR) 24 to obtain subscriber and location information for mobile stations presently being served by MSCe 18. In a similar manner, an MS 26 communicates over a communication link 28 with a BS 30. BS 30 is further coupled to MSCe 32 and to media gateway (MGW) 34. MSCe 32 is coupled to an MGW 34, packet network 22 and to an HLR/VLR 36. Finally, as may be seen, a landline phone 40 is coupled to a public switched telephone network 42 which is coupled to MSCe 18/MSCe 32 for call signaling and MGW 20/MGW 34 for transporting the voice call bearer.

In operation, when MS 12 initiates a call to MS 26, for example, by transmitting call setup signals, the present embodiment of the invention is operable to carry a list of voice codecs that MS 12 supports. Thus, the network elements of network 10 are operable to carry signaling that includes the list of MS 12 voice codecs. Thus, the list of voice codecs supported by MS 12 is transmitted to BS 16. The list of MS 12 supported voice codecs and a list of BS available transcoders are passed by BS 16 to MSCe 18. MSCe 18, creates a list of codecs based upon a list of available transcoders from MGW 20 and BS 16 and also upon the supported voice codecs from MS 12. MSCe 18, sends the list of codecs through packet network 22 to MSCe 32.

MSCe 32 then uses BS 30 to determine what voice codecs are presently supported by MS 26 by using communication link 28. MSCe 32 also determines what transcoders are available in BS 30 and MGW 34. Using all the collected transcoder information (from MGW 34, BS 30) and the voice codec information from MS 26, MSCe 32 then matches the list of codecs to the list of codecs sent by MSCe 18 or rejects all of the codecs in the list.

The matched codec information (or rejection information) is then sent back from MSCe 32 through packet network 22 to MSCe 18. MSCe 18 either configures MGW 20, BS 16 and MS 12 based upon the matched codec information sent by MSCe 32 or terminates the call request if MSCe 32 has rejected all of the voice codecs.

Advantageously, the system and method provide, therefore, for reducing or eliminating transcodings whenever a calling party and called party are operable to utilize a common voice codec or transcoder outputs as compared to a circuit-switched network that uses SS7 for call control in which at least two transcodings occur. For example, if MS 12 and MS 26 are supporting the same voice codec (e.g., compressed speech, codec-A), then MSCe 18 will send codec-A as part of its list of codecs to MSCe 32, and MSCe 32 will return codec-A as part of its return information to MSCe 18. In this example, no transcoding is performed in BS 16, MGW 20, MGW 34 and BS 30. Thus, codec-A is utilized from MS 12 to MS 26 minimizing associated resources for conducting such speech through network 10.

Figure 2:
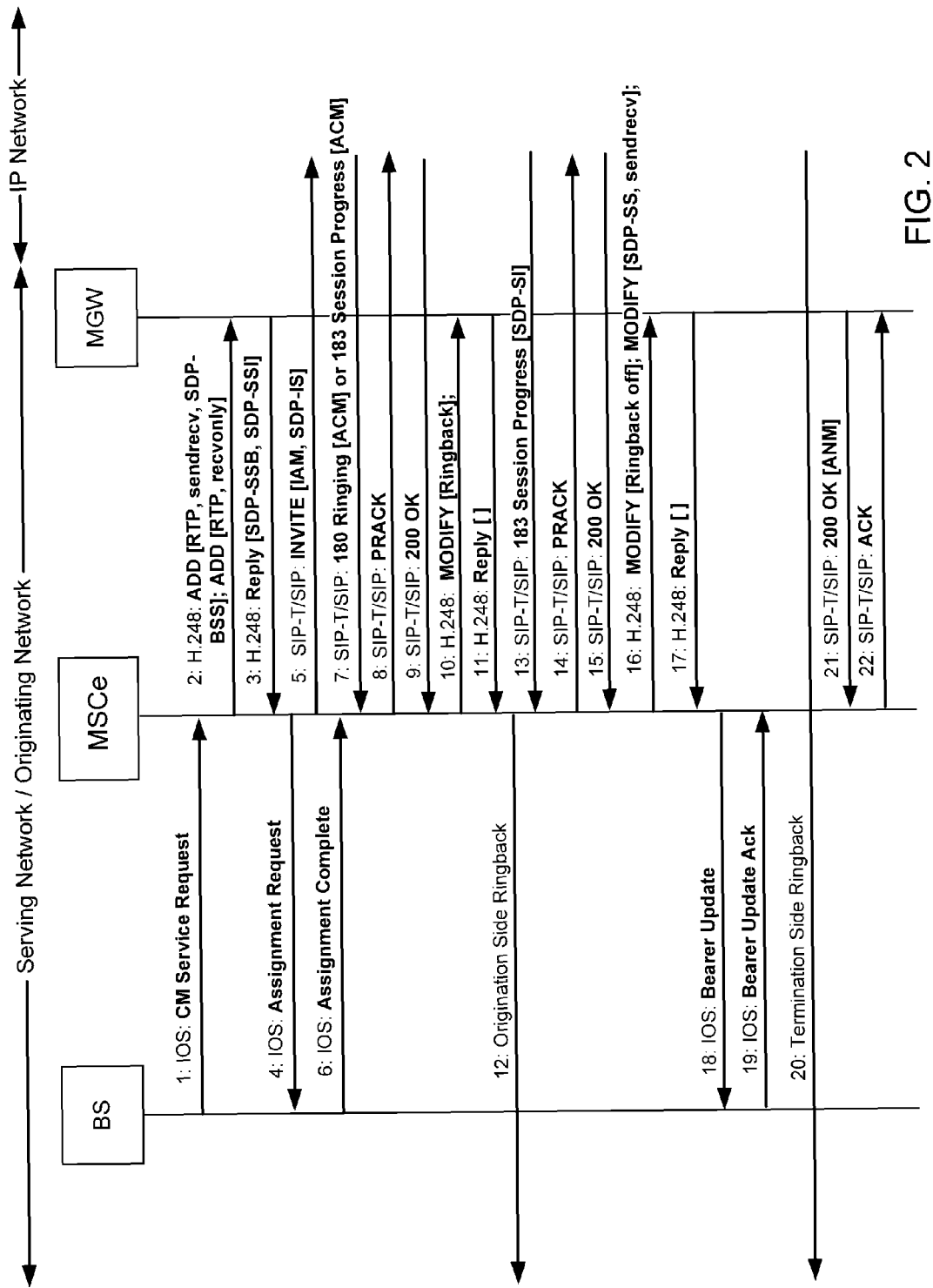
FIG. 2 is a signal sequence diagram that illustrates call origination utilizing SIP-T/SIP according to one embodiment of the invention.

FIG. 2 is a signal sequence diagram that illustrates call setup utilizing SIP-T/SIP according to one embodiment of the invention. Generally, the inventive method addresses the following aspects of how a call is setup in a wireless communication network utilizing SIP/SIP-T for call set-up and, more specifically:

1. How the call control entity (MSCe for a LMSD network) in the originating network determines bearer resources availability in other LMSD network entities (e.g., base station, media gateway);
2. How the call control entity (MSCe) signals to the network supporting the called party its preference as to where it desires to received bearer information from the called party and what voice format/formats is desires after call establishment;
3. When bearer resources in the network supporting the calling party are allocated;
4. How bearer path connection information is passed between the originating network bearer entities (e.g., between the serving/originating media gateway and the serving/originating base station);
5. How the Serving/Originating MSCe starts ringback to the calling party from the originating network (referenced as origination-side ringback); and
6. How the Serving/Originating MSCe discontinues origination-side ringback to allow for termination-side ringback and/or call cut-through (called mobile starts to speak) to occur.

Along these lines, the steps of the embodiment of the present invention, defined in relation to FIG. 2 are as follows:

1. An MS (a calling party terminal device) makes a request to the BS to originate a call. In the request to the BS the MS includes a list of supported voice codecs. Triggered by the MS request, a CM Service Request [IOS5] message is sent from the BS to the Serving MSCe. The CM Service Request message contains the BS connection information (where the BS desires to have bearer packets sent to, for example, an IP address and UDP port number), a list of voice codecs supported by the MS and a list of available BS transcoders.

2. This signal supports establishing a context between the MSCe and a media gateway (MGW) for the purpose of establishing a packet-data connection to a base station (BS) and informing the MGW as to which BS connection point to send data packets. Further, this signal supports establishing a context between the MSCe and a media gateway (MGW) for the purpose of establishing a packet-data connection to a network entity that supports the called party.

More specifically, the Originating MSCe establishes a context with an Originating MGW. The H.248 message consists of two ADD commands. The first ADD command establishes a termination to the base station (BS) for a bearer channel using RTP. The termination mode may be set to sendrecv allowing the termination to either send or receive packets. The ADD command also contains a remote SDP (labeled SDP-BSS) that contains the connection information (e.g., IP address and UDP Port number) from the BS as to where the Serving MGW is to send RTP packets to.

The second ADD command establishes a termination towards the IP Network for a bearer channel using RTP. The mode may be set to recvonly allowing the termination to send packets yet to ignore any received packets. The termination may be set to recvonly for fraud prevention.

3. This signal informs the MSCe as to the MGW connection point that it wants the BS to send data packets to and the MGW connection point that it wants the network entity supporting the called party to send data packets to.

More specifically, the Serving MGW replies to the H.248 message sent in Step 2. The H.248 Reply message contains a local SDP (labeled as SDP-SSI) message which contains termination information (for example an IP address and UDP port number where the Serving MGW desires to receive data packets) for establishing a connection to a network entity (e.g., a MGW supporting the called party) through the IP network. The Reply message also contains a local SDP (labeled as SDP-SSB) which contains termination information (for example an IP address and UDP port number where the Serving MGW desires to receive data packets) for establishing a connection to the Serving BS. The local SDPs (labeled as SDP-SSI and SDP-SSB) also contain a list of transcoders that the Serving MGW supports for sending and receiving formatted data through it. For example the Serving MGW might support a EVRC to G.711 transcoder. This implies that the Serving MGW is capable of 1) receiving EVRC formatted data from the Serving BS, converting the EVRC formatted data to a G.711 format and then sending the G.711 formatted data towards the IP network and 2) receiving G.711 formatted data from the IP network, converting the G.711 formatted data to an EVRC format and then sending the EVRC formatted data towards the Serving BS.

4. Generally, this signal flow supports transmitting a message from the MSCe to the BS for the purpose of instructing the BS to establish a bearer resource connection between the calling party terminal device and the BS, sending the BS information as to which MGW connection point the BS is to send data packets to, to instruct the BS as to whether to use a transcoder in the bearer path between the BS-to-MS connection and the BS-to-MGW connection and if so, which one, and for assigning the calling party terminal device (MS) to a codec.

More specifically, the Serving MSCe sends an Assignment Request [IOS5] message to the BS to request assignment of radio resources for the MS requesting to make the call. The Assignment Request message contains the Serving MGW connection information (obtained for SDP-SSB), the voice codec assignment for the originating MS (see Step 1), and if required a transcoder assignment for the BS (see Step 1).

5. Generally, this signal flow supports the MSCe sending an SIP/SIP-T call/session initiation message to a network entity supporting the called party wherein the message contains a list of preferred codecs for call/session setup and may contain an ISUP Initial Address message within the SIP call/session initiation message payload.

More specifically, the Serving MSCe sends an INVITE [RFC3261] message to the Serving MSCe. The INVITE contains an SDP message (labeled SDP-IS) and may contain an IAM [ISUP] message as defined by [RFC3372]. SDP-IS contains a list of voice codecs generated by the Serving MSCe. Information that might be used to generate SDP-IS includes, but is not limited to 1) the assigned MS voice codec, 2) any assigned transcoders in the Serving BS and 3) information in SDP-SSB.

6. Generally, this signal flow supports the BS sending the MSCe a message confirming the codec that the calling party terminal device is using, confirming that a connection has been established between the calling party terminal device and the BS and if the BS is using a transcoder between the BS-to-MS connection and the BS-to-MGW connection to confirm which transcoder.

More specifically, after the radio traffic channel and circuit have both been established for the MS requesting the call, the BS sends an Assignment Complete [IOS5] message to the Serving MSCe. At this point the connection between the Serving MSCe and the Serving BS is considered established and the connection between the Serving BS and the calling party terminal device (e.g., MS) is also considered established.

7. The Serving MSCe receives either a SIP 180 Ringing [RFC3261] message or a SIP 183 Session Progress [RFC3261] message. The payload of the SIP 18x message may also contain an ACM [ISUP] message.

8. In response to the SIP 18x message, the Serving MSCe may send a PRACK [RFC3262] message to the IP network.

9. In response to the PRACK [RFC3262] message sent in Step 8, the Serving MSCe receives a SIP 200 OK [RFC3261] message.

10. If the Serving MSCe received a 180 Ringing message (Step 7), the Serving MSCe sends an H.248 message containing a MODIFY command to the Serving MGW. The MODIFY command initiates Ringback (call progress tones) that are sent out the Serving MGW termination towards the Serving BS. Ringback generated within the Serving/Originating network is referenced as Origination-Side Ringback.

Generally, upon receiving the SIP 180 Ringing message, the MSCe instructs a MGW to generate progress tones to the calling party using the MGW- to BS connection and the BS-to-MS connection.

11. The Serving MGW acknowledges the H.248 message sent in Step 10 with a H.248 Reply message.

12. If the Serving MSCe received a SIP 180 Ringing [RFC3261] message (Step 7), then ringback from the Serving MGW is sent through the serving BS to the calling party terminal device (e.g., MS).

13. The Serving MSCe receives a SIP 183 Session Progress [RFC3261] message containing an SDP message (labeled SDP-SI). SDP-SI contains only a list of voice codecs. The SIP 183 Session Progress message is the answer to the offer made by the Serving MSCe (i.e., SIP INVITE sent in Step 5). The SDP-SI list of voice codecs is a subset of the SDP-IS list of voice codecs generated by the Serving MSCe in Step 5. SDP-SI also contains connection information (for example an IP address and UDP port number) as to where the network entity (e.g., a MGW supporting the called party) establishing a connection with the Serving MSCe desires to receive data packets.

For TrFO (no transcoding in the voice bearer path from calling party to the called party) to occur, SDP-SI would have to contain one of the calling party (e.g., MS) supported voice codecs.

14. In response to the SIP 183 Session Progress [RFC3261] message, the Serving MSCe may send a PRACK [RFC3262] message to the IP Network.

15. In response to the PRACK [RFC3262] message sent in Step 14, the Serving MSCe receives a SIP 200 OK [RFC3261] message.

16. Generally, upon receiving a SIP 183 Session Progress message (signal flow 13) containing a list of codecs for call/session setup from a network entity supporting the called party, the MSCe instructs a MGW to discontinue the generation of progress tones to the calling party using the MGW- to BS connection and the BS-to-MS connection.

More specifically, after receiving the SIP 183 Session Progress message (Step 13) the Serving MSCe sends a H.248 message containing either one MODIFY command (if the Serving MSCe received a SIP 183 Session Progress message in Step 7) or two MODIFY commands (if Serving MSCe received a SIP 180 Ringing message in Step 7). The first MODIFY command sets the mode of the termination towards the IP network to sendrecv (allowing the Serving MGW termination to either send packets to the IP network or receive packets from the IP network) and contains a remote SDP (labeled SDP-SS) message. SDP-SS is the remote SDP containing the connection information (received in SDP-SI, see Step 13) for the network entity that desires to establish a connection through the IP network to the Serving MGW. If required, SDP-SS also contains a transcoder assignment for the Serving MGW (note the list of available Serving MGW transcoders was sent to the Serving MSCe in Step 3).

The second MODIFY command (if present) terminates the Origination-Side Ringback.

17. The Serving MGW acknowledges the H.248 message with a Reply message. The connection between the Serving MGW and the network entity desiring to establish a connection with it (through the IP network) is now considered established.

18. If the Serving MSCe elects to utilize/modify transcoders in the Serving BS then the Serving MSCe sends the base station a Bearer Update [IOS5] message.

19. The Serving BS acknowledges the Bearer Update [IOS5] message with a Bearer Update Ack [IOS5] message.

20. If the network supporting the called party elects to initiate ringback (referenced as Termination-Side Ringback), then ringback from the IP network is sent through the Serving MGW through the Serving BS to the calling party terminal device (e.g., MS).

21. The Serving MSCe receives a SIP 200 OK [RFC3261] message. The payload of the SIP 200 OK message may contain an ANM [ISUP]. The SIP 200 OK message acknowledges that the SIP INVITE (Step-5) message has succeeded.

22. The Serving MSCe sends an SIP ACK [RFC3261] message to the IP Network. The ACK message confirms the reception of the final response (i.e., SIP 200 OK in Step 21).

With respect to the above signal flows, one interesting aspect of the present invention relates to transfer of ringback from an originating network element to a terminating network element. For example, signal flow 12 provides for origination side ringback. Thereafter, however, signal flows 14 and 16, which may occur substantially at the same time, result in signal flow 20 which provides for termination side ringback. Thus, ringback may be transferred from the origination side to the termination side.

Figure 3:
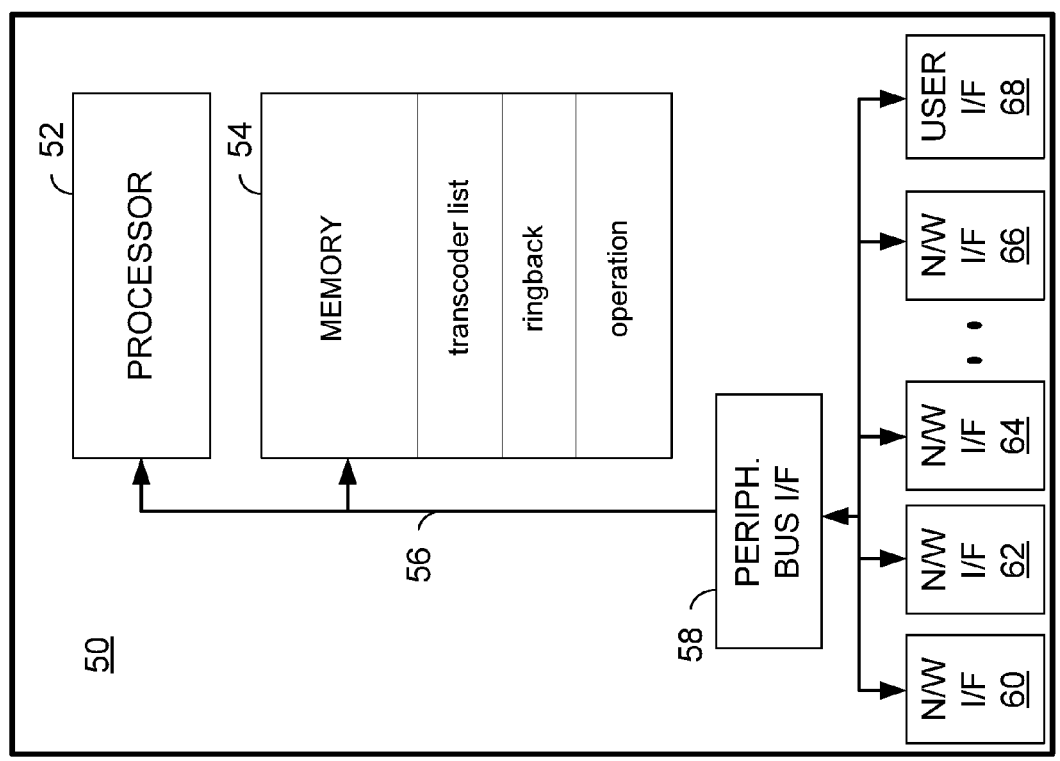
FIG. 3 is a functional block diagram of an MSCe formed according to one embodiment of the invention.

FIG. 3 is a functional block diagram of a network element formed according to one embodiment of the invention. Generally, the block diagram of FIG. 3 may represent a base station in which the computer instructions stored within define logic to effect base station operation as described herein. Alternatively, the block diagram may represent an MSCe in which the computer instructions stored within define logic to effect MSCe operation as described herein. Referring now to FIG. 3, a network element 50 includes a processor 52 that is operable to retrieve computer instructions from memory 54 over a bus 56, which computer instructions define operational logic of network element 50. More specifically, the computer instructions define logic for processing a transcoder list as described herein, logic for ringback operation as disclosed herein, and logic for routine network element operation according the type of network element and its associated functionality. The logic for routine operation includes logic for communicating through at least one network port utilizing standardized protocols.

Bus 56 is further coupled to a peripheral bus interface 58 which is, in turn, connected to at least one network port. In the described embodiment, network element 50 includes at least five network ports labeled as network I/Fs (interfaces) 60-68. Thus, network element 50 is operable to transmit (if the network element is a base station) or receive (if the network element is an MSCe) a list of supported mobile station voice codecs and available transcoders through one network interface 60-68. Additionally, an MSCe (if network element 50 is an MSCe) is operable to start and stop ringback to the calling party. In this case, network element 50 includes operational logic that enables it to act as a serving/originating MSCe. More generally, the MSCe formed according to the described embodiment is operable to perform any of the method steps described in the signal sequence diagrams as described for the embodiments of the invention and variations thereof and specifically includes logic and circuitry for performing said steps.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. Additionally, the computer instructions may be modified to create permutations of the inventive methods or signals whose differences from what is disclosed and claimed are insubstantial. The described embodiments may be modified in many different ways without departing from the scope or teachings of the invention. The Applicant makes reference a set of acronyms and definitions extracted from technical documents that may be of assistance to the reader.

REFERENCES AND ACRONYM DEFINITIONS

ACM Address Complete Message. Defined as part of [ISUP]
ACM H.248 Command—The Add command adds a Termination to a Context. The Add command on the first Termination in a Context is used to create a Context.
ANM Answer Message. Defined as part of [ISUP]
BS Base Station
CDMA Code division multiple access
CODEC Compressor/decompressor—a codec is any technology for compressing and decompressing data
EVRC Enhanced Variable Rate Codecs
  The Enhanced Variable Rate Codec (EVRC) compresses each 20 milliseconds of 8000 Hz, 16-bit sampled speech input into output frames in one of the three different sizes: Rate 1 (171 bits), Rate ½ (80 bits), or Rate ⅛ (16 bits).
  The EVRC codec is defined in: 3GPP2 C.S0014, "Enhanced Variable Rate Codec, Speech Service Option 3 for Wideband Spread Spectrum Digital Systems", January 1997.
G.711 Defined by ITU-T Recommendation G.711, "Pulse Code Modulation (PCM) of Voice Frequencies".
H.248 Defines the protocols used between elements of a physically decomposed multimedia gateway (e.g., ITU-T Recommendation H.248.1).
HLR Home Location Register is the location register to which a user identity is assigned for record purposes such as subscriber information (e.g. ESN, MDN, Profile Information, Current Location, and Authorization Period). The HLR may, or may not be located within, and be indistinguishable from an MSCe. The HLR may serve more than one MSCe. The HLR may be distributed over more than one physical entity.
IAM Initial Address Message. Defined as part of [ISUP]
INVITE A SIP Method (defined is RFC3261) that that specifies the action that a calling party wants from a called party.
IOS Interoperability Specification
[IOS5] Interoperability Specifications that is defined in 3GPP2 A.S0011-C through A.S0017-C.
IP Internet Protocol—there are two version of IP, IPv4 (defined in IETF RFC 0791) and IPv6 (defined in IETF RFC 2460).
ISUP ISDN User Part
[ISUP] Defined in either ITU-T Q.761-764 or ANSI T1.113-2000
LMSD Legacy MS Domain
MGW Media GateWay
MODIFY H.248 command—The Modify command modifies the properties, events and signals of a Termination.
MS Mobile Station—wireless terminal device
MSCe Mobile Switching Center emmulation
MSID Mobile Station Identifier
Origination-Side Ringback (call progress tones) that are generated by some element Ringback within the Network supporting the calling party (e.g., a MGW or a terminal device)
PRACK Provisional Response ACKnowledgement—An extension to the Session Initiation Protocol (SIP) providing reliable provisional response messages (defined in IETF RFC 3262)
PSTN Public Switched Telephone Network
[RFC3261] IETF RFC 3261, "The Session Initiation Protocol". June 2002, IETF,
[RFC3262] IETF RFC 3262, "Reliability of Provisional Responses in the Session Initiation Protocol (SIP)". June 2002,

[RFC3372] IETF RFC 3372, "Session Initiation Protocol for Telephone (SIP-T): Context and Architectures." September 2002.

Reply Reply to an H.248 Command (e.g., ADD)

RTO Remote Transcoder Operation: a network capability for endpoints with incompatible codecs. RTO attempts to enable the bearer by matching the incompatible codecs with a single transcoder. Ideally compressed speech is passed between the endpoints.

RTP Real-Time Transport Protocol (defined in IETF RFC 1889)

SDP Session Description Protocol (defined in RFC 2327)

Serving Network The network in which the terminal device (e.g., MS) is currently registered.

SIP Session Initiation Protocol (defined in RFC 3261)

SIP-T Session Initiation Protocol for Telephones (defined in RFC 3272)

SS7 Signaling System Number 7

Termination-Side Ringback Ringback (call progress tones) that are generated by some element within the Network supporting the called party (e.g., a MGW or a terminal device)

TrFO Transcoder Free Operation: a network capability for mobile-to-mobile calls, where the mobiles have identical codecs. TrFO enables the bearer path without introducing vocoders in the voice bearer path. Compressed speech is passed between the terminal device endpoints.

Transcoder A function (e.g., implemented in Software or Hardware) that changes data from one format to another (e.g., from EVRC to G.711)

UDP User Datagram Protocol. Protocol defined in IETF RFC 0768.

VLR The Visitor Location register (VLR) is the location register other than the HLR used by an MSCe to retrieve information for handling of calls to or from a visiting subscriber. The VLR may, or may not be located within, and be indistinguishable from an MSCe. The VLR may serve more than one MSCe.

Vocoder Voice codec.

[41-1] ANSI/TIA/EIA-41-D "Cellular Radiotelecommunications Intersystem Operations", December 1997.

What is claimed is:

1. A method in a communication network in which a session initiation protocol (SIP) is overlaid on a code division multiple access network for reducing a number of transcoders in a voice bearer path, the SIP for initiating a session between a calling party and a called party, the method comprising:

transmitting a connection management (CM) Service Request message to initiate a call from a base station (BS) to a Serving mobile switching center (MSCe), the CM Service Request message containing BS connection information, a list of voice codecs and a list of BS transcoders;

establishing a context between the MSCe and a media gateway (MGW);

transmitting a message from the MSCe to the BS for the purpose of instructing the BS to establish a bearer resource connection between a terminal device of the calling party and the BS, sending the BS connection information as to which MGW connection point the BS is to send data packets to, instructing the BS as to whether or not to assign a transcoder in the voice bearer path in a BS-to-MS connection or in a BS-to-MGW connection, and if so, assigning the terminal device of the calling party to a voice codec selected from the list of voice codecs;

sending a SIP call/session initiation message from the MSCe to a network entity supporting the called party, wherein the SIP call/session initiation message contains a list of preferred codecs for call/session setup; and upon receiving a SIP 180 Ringing message, the MSCe instructs the MGW to generate progress tones to the terminal device of the calling party.

2. The method of claim 1 wherein the BS sends the MSCe a message confirming the voice codec that the terminal device (MS) of the calling party is using and confirming which transcoder is being used or is to be used by the BS.

3. The method of claim 1 wherein, upon receiving a SIP 183 Session Progress message containing another list of voice codecs for call/session setup from a network entity supporting the called party, the MSCe instructing the MGW to discontinue the generation of progress tones to the terminal device (MS) of the calling party using at least one of the MGW-to-BS connection and the BS-to-MS connection.

4. A method in a mobile switching center (MSCe) of a communication network for call setup utilizing session initiation protocol (SIP) protocol and more specifically for initiating a session between a calling party and a called party, the method comprising:

receiving a connection management (CM) Service Request message from a base station (BS), the CM Service Request message containing BS connection information, a list of supported calling party terminal device voice codecs and a list of BS transcoders;

establishing a context with an originating media gateway (MGW) by:

transmitting a H.248 message to establish a termination to the BS for a voice bearer channel using Real-Time Transport Protocol (RTP) and a Session Description Protocol (SDP) message which contains connection information for which the MGW is to use to send RTP packets to the BS; and transmitting another H.248 message to establish a termination to a bearer device supporting the called party using RTP;

receiving a Reply message from a serving MGW containing another SDP message for where the serving MGW wants the BS to send RTP packets to and a further SDP message for where the serving MGW wants a bearer device supporting the called party to send RTP packets; and sending an Assignment Request message to the BS to instruct the BS to assign radio resources to a terminal device of the calling party, to instruct the BS as to which serving MGW connection point to send RTP packets to, to instruct the BS whether to use a transcoder, and if so, which one, and to instruct the BS to assign the terminal device of the calling party to a specific voice codec.

5. The method of claim 1 further comprising sending a SIP INVITE message to a call control entity supporting the called party, wherein the SIP INVITE message contains yet another SDP message that further includes a prioritized list of codecs to be used for call negotiation.

6. The method of claim 5 wherein the SIP INVITE message further includes an integrated services digital network (ISDN) User Part (ISUP) Initial Address Message (IAM) message.

7. The method of claim 4 further comprising receiving an Interoperability Specification (IOS) Assignment Complete message from the BS confirming the specific voice codec that the terminal device of the calling party is using, confirming that radio resources have been assigned to the terminal device of the calling party and if the BS is using a transcoder between a BS-to-MS connection and a BS-to-MGW connection to confirm which of the BS transcoders are being used.

8. The method of claim 5 wherein, if the MSCe received a 180 Ringing message, the MSCe sends yet another H.248 message to the serving MGW for the purpose of generating progress tones to the terminal device of the calling party through the BS-to-MGW connection and the MS-to-BS connection.

9. The method of claim 5 wherein the MSCe receives a SIP 183 Session Progress message wherein the SIP 183 Session Progress message contains yet another SDP message which further includes a list of codecs to be used for the session between the calling party and the called party.

10. The method of claim 9 wherein the MSCe, based upon receiving the SIP 183 Session Progress message, sends yet another H.248 message to the serving MGW to modify the BS-to-MGW connection to cause progress tones to the terminal device of the calling party to be discontinued.

11. A serving mobile switching center (MSCe) for call delivery to a mobile station (MS) in a wireless communication network, comprising:
 circuitry configured to receive and process a connection management (CM) Service Request message, indicating that a call is to be setup with a specified called party, containing base station (BS) connection information, a list of voice codecs supported by a terminal device of the calling party and a list of BS transcoders;
 circuitry configured to establish a context with a media gateway (MGW) by transmitting a H.248 message to establish a termination to the BS for a voice bearer channel using Real-Time Transport Protocol (RTP) and also contains a Session Description Protocol (SDP) message that contains connection information for which the MGW is to use to send RTP packets to the BS; and
 circuitry for transmitting an Assignment Request message to instruct the BS to assign radio resources to the terminal device of the calling party, to instruct the BS as to which MGW connection point to send RTP packets to, to instruct the BS whether to use a transcoder, and if so, which one, and to instruct the BS to assign the terminal device of the calling party to a specific voice codec.

12. The serving MSCe of claim 11 further comprising:
 circuitry configured to establish a context with the MGW by transmitting another H.248 message to establish a termination to a bearer device supporting the called party using the RTP; and
 circuitry configured to receive and process a H.248 Reply message from the MGW containing a further SDP message for identifying where the serving MGW wants the BS to send RTP packets to and another SDP message for identifying where the MGW wants a bearer device supporting the called party to send RTP packets.

13. The serving MSCe of claim 11 wherein the serving MSCe is operable to transmit a SIP INVITE message to a call control entity supporting the called party, the SIP INVITE message further includes a prioritized list of codecs to be used for call negotiation.

14. The serving MSCe of claim 11 wherein the serving MSCe, based upon receiving a SIP 183 Session Progress message, sends another H.248 message to the MGW to modify a BS-to-MGW connection to cause progress tones to the terminal device of the calling party to be discontinued.

* * * * *